Nov. 16, 1937.    A. GORDON    2,099,061
WASTE TRAP
Original Filed July 20, 1935
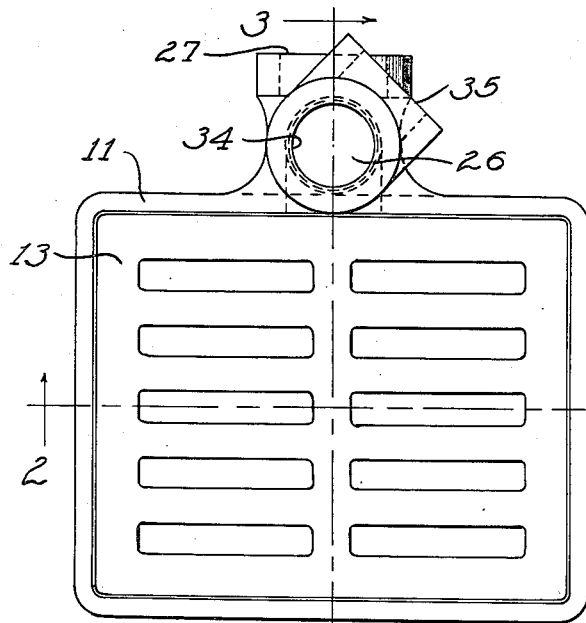
Fig. 1.
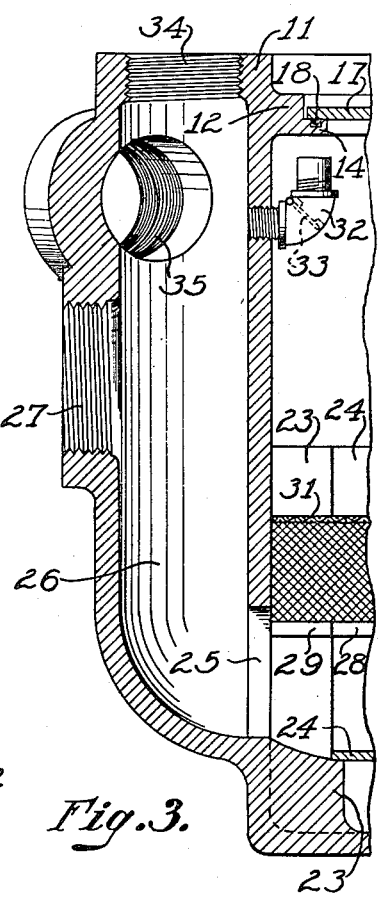
Fig. 3.
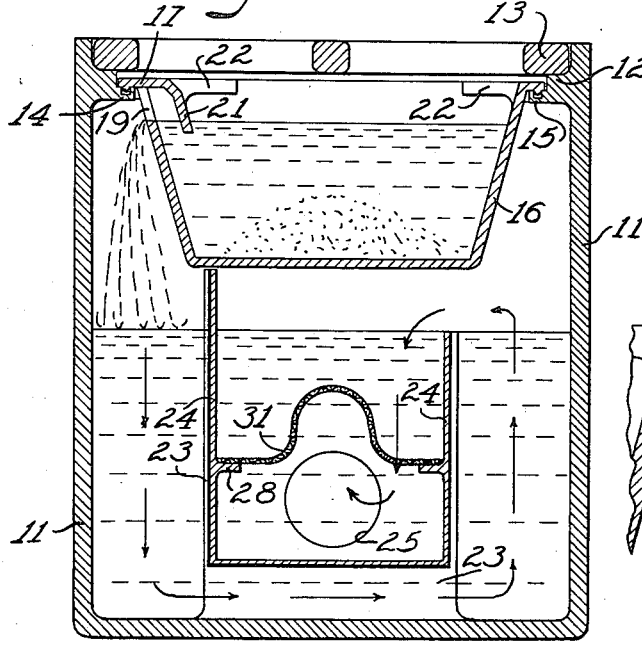
Fig. 2.
Fig. 4.
Arthur Gordon
Inventor
By: Charles B. Rasmussen
Attorney.

Patented Nov. 16, 1937

2,099,061

UNITED STATES PATENT OFFICE 2,099,061

WASTE TRAP

Arthur Gordon, Chicago, Ill.

Application July 20, 1935, Serial No. 32,351
Renewed April 3, 1937

4 Claims. (Cl. 182—9)

This invention relates in general to traps and more particularly to combination drain and waste traps adapted for treating waste water from garages and the like for the removal of oil, grease and sediment therefrom.

A principal object of the invention is the provision of certain improvements in combination drain and waste traps, similar to that disclosed in my prior Patent No. 1,959,623 issued May 22, 1934, whereby backing up of sewer gas and the like is positively prevented and the trap is, as a consequence, completely fireproof.

Another important object of the invention is the provision of a removable catch basin or pan which engages or is supported by the usual basin forming the walls of the trap in such manner as to allow a water seal to form at the point of connection between the basin and the pan to prevent the escape of gas therethrough.

Another important object of the invention is the provision of baffle means adjacent the outlet of said pan or catch basin and so related thereto as to form another seal against the escape of gas from the main basin through the pan.

A further important object of the invention is the provision of valve means which will be automatically opened to break the siphoning of the trap when the vent is clogged or choked, and which will be automatically closed to prevent backing up of water or sewer gas.

Another important object of the invention is the provision of a plurality of vent openings so placed that the vent can be taken directly vertically from the trap or can be run horizontally from the trap.

Numerous other objects and advantages of the invention will be apparent as it is better understood from the following description, which, taken in connection with the accompanying drawing, discloses a preferred embodiment thereof.

In the drawing,

Figure 1 is a plan view of a combination drain and trap embodying the features of my invention;

Fig. 2 is a vertical section taken substantially on the line 2—2 of Fig. 1;

Fig. 3 is a slightly enlarged vertical section taken substantially on the line 3—3 of Fig. 1, with parts broken away; and Fig. 4 is an enlarged detail sectional view of the connection between the main basin and the removable pan, showing the latter in partially raised position.

Referring more particularly to the drawing, reference character 11 indicates the basin proper of my improved trap, which basin may be of any desired cross sectional shape (circular, or rectangular as shown) and may be formed of any suitable material. The upper edge of the basin 11 is open, and is provided adjacent thereto with an inwardly extending annular flange 12, upon the upper surface of which is supported a suitable cover 13 in the form of a grating of a size and strength to permit the use of the same in garages and the like. The grating 13 is readily removable for the purpose of gaining access to the interior of the basin 11.

The inner portion of the annular flange 12 is cut away to provide a thinner annular flange 14, the upper surface of which is provided with a centrally located groove 15 (note Fig. 4 particularly). It is to be understood that the groove 15 and the flanges 12, 14 extend completely around the main basin 11, and are preferably formed integral with the said basin.

A catch basin in the form of a pan 16 with an outwardly extending circumferential flange 17 is adapted to be removably inserted in the main basin 11, with the flange 17 resting on and supported by the flange 14. On its lower edge, the flange 17 is provided with an annular rib or bead 18 which is adapted to seat within the annular groove 15 in the flange 14 when the pan 16 is in operative position, as shown in Fig. 2.

The pan 16 is provided along one side and adjacent the upper edge thereof with an outlet in the form of a slot 19 (Fig. 2). Extending from one end of the pan to the other, substantially parallel with the side having the slot 19, is an inwardly and downwardly extending flange 21 which depends somewhat below the lower edge of the slot 19. The pan 16 may also be provided with horizontal, inwardly extending lugs 22 to be used as handles to facilitate the lifting of the pan out of the basin 11 after the grating 13 has been removed. The pan 16, including the flange 21 and lugs 22, is preferably cast or otherwise integrally formed.

On each of the two inner walls of the main basin 11, which are normal to the side of the pan 16 containing the outlet slot 19, there is provided an inwardly extending U-shaped flange 23 having suitable slots for receiving one end of a removable separator 24. The separator 24 is of substantially U-shaped formation in cross-section, as shown in Fig. 2, having one wall of less height than the other with the higher wall terminating slightly below the bottom of the pan 16 when all the parts are properly assembled, and having its other ends which co-operate with the flanges 23, open.

These open ends are closed by the flanges 23 and walls of the basin 11.

With this arrangement, all water entering the basin from the slot 19 in the pan 16 must travel around the under side of the separator 24 and over the short wall to reach the usual outlet 25 provided in one side wall of the basin, as shown by the arrows in Fig. 2. The outlet 25 communicates with a chamber 26 preferably formed integrally with the basin 11 exteriorly of the wall containing the outlet 25. The chamber 26 is also provided with an outlet 27 which may be connected with the sewer in the usual manner.

Intermediate the top and bottom of the separator 24 and adapted to rest on suitable supporting flanges 28 and 29 formed integrally with the separator and the flanges 23, respectively, is disposed a removable screen 31 which may be of a substantially beehive construction.

Threaded into a tapped hole in the wall of the basin 11 containing the outlet 24 so as to communicate with the chamber 26 is a fixture 32 comprising an open ended fitting having a suitable fly or swing valve 33. With this special arrangement, the valves 33 will be automatically closed by back pressures to prevent gases from escaping therethrough, while at the same time it provides an automatically operable means for breaking a siphoning of the trap caused by blocking or clogging of the usual vent communicating with the chamber 26.

At the upper end of the chamber 26 there is provided a vertically disposed tapped opening 34, and in the side wall of the chamber there is a similar horizontally disposed tapped opening 35. Either of these openings 34, 35 may be connected in any desired manner to the usual vent or stack, the one not so connected being sealed with a suitable plug. Thus either a vertical or horizontal lead to the vent may be employed, as best suits the particular installation.

With the above described arrangement of parts it will readily be seen that easy access to the interior of the basin may be had for cleaning, etc., the grating 13, pan 16, screen 31 and separator 24 being quickly and easily removable in the order named.

Water and materials carried thereby entering the trap first enter the pan 16, through the grating 13, within which will be deposited all heavier sediment, as sand or the like. From the pan 16 the water escapes through the outlet 19 into the basin 11. The flow in the basin will follow the arrows in Fig. 2 around the separator 24, through the screen 31 and out through the outlets 25 and 27. Any oils or greases present will rise to the top of the water level in the basin 11, and any sediment not caught by the pan 16 will be restrained by the screen 31, so that the waste water entering the outlet 25 will be practically clear of any sediment, oils or greases.

Due to the provision of the annular groove 15 and rib 18, a small amount of water will be trapped around the upper edge of the pan 16 on the flange 14, resulting in a water seal which will effectively prevent the escape of gases between the pan 16 and the basin 11.

In addition to this, another effective water seal is maintained by the baffle or flange 21, as will be readily apparent from the showing of Fig. 2, which prevents the escape of gases back through the outlet slot 19.

With the provision of the swinging valve 33 in the open-ended fixture 32, not only is the breaking of a siphon insured, but escape of gases or water therethrough is prevented.

It will be apparent that a completely fool-proof and fireproof combination drain and waste trap is thus provided.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a combination drain and waste trap having a main basin, an annular, inwardly extending flange forming a part of said basin, and a removable member having a circumferential flange adapted to co-operate with said first mentioned flange to allow a water seal to be automatically formed between said member and said basin by the water draining into the trap to prevent the escape of gases therebetween.

2. In a combination drain and waste trap having a main basin, an annular, inwardly extending flange forming a part of said basin, and a removable member having a circumferential flange adapted to co-operate with said first mentioned flange to allow a water seal to be automatically formed between said member and said basin by the water draining into the trap to prevent the escape of gases therebetween, said first mentioned flange being provided with an annular groove, and said second flange being provided with a circumferential rib adapted to co-operate with said groove.

3. In a device of the class described having a main basin and an outlet chamber communicating therewith, an open-ended fixture communicating with said chamber and said basin for breaking a siphoning of said basin, and means in said fixture for preventing the escape of gases therethrough into said basin.

4. In a device of the class described having a main basin and an outlet chamber communicating therewith, an open-ended fixture communicating with said chamber and said basin for breaking a siphoning of said basin, and means in said fixture for preventing the escape of gases therethrough into said basin, said means comprising a swinging valve.

ARTHUR GORDON.